(12) United States Patent
Magyari

(10) Patent No.: US 10,066,711 B2
(45) Date of Patent: Sep. 4, 2018

(54) VARIABLE TRANSMISSION AND METHOD AND SYSTEM OF MANUFACTURE

(71) Applicant: Douglas Magyari, Royal Oak, MI (US)

(72) Inventor: Douglas Magyari, Royal Oak, MI (US)

(\*) Notice: Subject to any disclaimer, the term of this patent is extended or adjusted under 35 U.S.C. 154(b) by 874 days.

(21) Appl. No.: 14/398,232

(22) PCT Filed: May 2, 2013

(86) PCT No.: PCT/US2013/039214
§ 371 (c)(1),
(2) Date: Oct. 31, 2014

(87) PCT Pub. No.: WO2013/166248
PCT Pub. Date: Nov. 7, 2013

(65) Prior Publication Data
US 2015/0126327 A1 May 7, 2015

Related U.S. Application Data

(60) Provisional application No. 61/641,939, filed on May 3, 2012.

(51) Int. Cl.
*F16H 15/04* (2006.01)
*F16H 3/42* (2006.01)
(Continued)

(52) U.S. Cl.
CPC ........... *F16H 15/04* (2013.01); *B23K 1/0008* (2013.01); *B32B 37/142* (2013.01); *F16H 3/423* (2013.01);
(Continued)

(58) Field of Classification Search
CPC ....... F16H 15/04; F16H 3/423; F16H 57/0018
(Continued)

(56) References Cited

U.S. PATENT DOCUMENTS 359,076 A 3/1887 Hoffman
825,759 A 7/1906 Ruck
(Continued)

FOREIGN PATENT DOCUMENTS

CN 101550995 A 10/2009
DE 88107 C 8/1896
(Continued)

OTHER PUBLICATIONS

International Preliminary Report for corresponding Appln. No. PCT/US2013/039214, dated Nov. 13, 2014, 8 pages.
(Continued)

*Primary Examiner* — William C Joyce
(74) *Attorney, Agent, or Firm* — Brooks Kushman P.C.

(57) ABSTRACT

A continuously variable transmission includes a driving member rotating about a first axis, a driven member rotating about a second axis, and an intermediate member interposed between the driving and driven members and rotating about a third axis configured to intersect the first and second axes. The intermediate member transfers torque from the driving member to the driven member. A method for forming a torque transfer member includes providing a base structure, wrapping a needle assembly around the base structure such that the needles extend outwardly therefrom, and affixing the needle assembly to the base structure. A method of manufacturing a needle assembly includes forming a series of pockets on a side of a ribbon, organizing a series of needles into a series of pockets, and affixing the series of needles into the series of pockets.

17 Claims, 8 Drawing Sheets

(51) Int. Cl.
　　　*B23K 1/00*　　　(2006.01)
　　　*B32B 37/14*　　(2006.01)
　　　*F16H 57/00*　　(2012.01)

(52) U.S. Cl.
　　　CPC .... *F16H 57/0018* (2013.01); *Y10T 29/49826* (2015.01)

(58) Field of Classification Search
　　　USPC ................................................ 476/50, 51, 5
　　　See application file for complete search history.

(56) References Cited

U.S. PATENT DOCUMENTS

| | | | |
|---|---|---|---|
| 861,082 A | 7/1907 | Bowne et al. | |
| 889,333 A | 6/1908 | Reenstiema | |
| 920,192 A | 5/1909 | Seymour | |
| 958,694 A | 5/1910 | Cox | |
| 1,416,158 A | 5/1922 | Balcker | |
| 1,416,567 A | 5/1922 | McNeel | |
| 1,713,027 A | 5/1929 | Cleaves | |
| 2,283,293 A | 5/1942 | Steiert | |
| 2,424,873 A * | 7/1947 | Abbrecht | F16H 15/06 476/51 |
| 2,526,435 A | 10/1950 | Teigman | |
| 2,545,152 A * | 3/1951 | Haidegger | F16H 15/28 475/215 |
| 2,690,661 A | 10/1954 | Briggs | |
| 2,936,638 A * | 5/1960 | Wassilieff | F16H 15/50 475/191 |
| 2,941,410 A | 6/1960 | Ota | |
| 2,970,494 A | 2/1961 | Lynch | |
| 3,143,895 A | 8/1964 | Robie | |
| 3,333,479 A * | 8/1967 | Shields | F16H 3/42 476/50 |
| 3,617,426 A | 11/1971 | Grundman | |
| 3,654,777 A | 4/1972 | Grundman | |
| 3,687,251 A | 8/1972 | Hoemer | |
| 3,718,009 A | 2/1973 | Perina | |
| 3,727,474 A * | 4/1973 | Fullerton | F16H 15/38 476/5 |
| 3,817,494 A | 6/1974 | Eckerdt | |
| 4,028,949 A | 6/1977 | Hagen | |
| 4,370,895 A | 2/1983 | Wright | |
| 4,616,519 A | 10/1986 | Yoshida | |
| 5,417,621 A | 5/1995 | Tibbles | |
| 5,514,047 A | 5/1996 | Tibbles et al. | |
| 5,641,320 A | 6/1997 | Ketcham | |
| 5,681,235 A | 10/1997 | Ketcham | |
| 6,338,692 B1 | 1/2002 | Magyari | |
| 6,964,630 B1 | 11/2005 | Magyari | |
| 7,399,254 B2 * | 7/2008 | Magyari | F16H 15/44 29/895.2 |
| 7,665,377 B2 | 2/2010 | Harrelson et al. | |
| 7,704,184 B2 | 4/2010 | Magyari | |
| 2007/0137341 A1 | 6/2007 | Harrelson et al. | |

FOREIGN PATENT DOCUMENTS

| | | | |
|---|---|---|---|
| DE | 730759 | * | 1/1943 |
| DE | 2034116 | | 1/1972 |
| DE | 2805699 A1 | | 9/1979 |
| DE | 3319178 A1 | | 2/1985 |
| FR | 850348 | | 12/1939 |
| FR | 1082168 A | | 12/1954 |
| FR | 2416401 | | 8/1979 |
| GB | 7579 | | 3/1911 |
| JP | 2000291759 A | | 10/2000 |
| JP | 2001355699 A | | 12/2001 |
| JP | 2007502942 A | | 2/2007 |
| WO | 9302302 A1 | | 2/1993 |

OTHER PUBLICATIONS

Chinese Office Action and English translation for Application No. 201380032163, dated Feb. 27, 2017, 20 pages.
Extended European Search Report for corresponding Application No. 13784845.3, dated Sep. 19, 2016, 13 pages.
Jahr, "Es ist kein formschlüssiges stufenloses Getriebe möglich", Antriebstechnik, vol. 28, No. 1, Jan. 1, 1989, pp. 45-46.
Daniel, "Ist ein stufenloses echt formschlüssiges Getriebe möglich", Antriebstechnik, vol. 23, No. 5, Jan. 1, 1984, pp. 49-50.
Chinese Office Action for corresponding Application No. 201380032163.1, dated Jun. 24, 2016, 8 pages.
International Search Report and Written Opinion for corresponding Application No. PCT/US2013/039214, dated Sep. 17, 2013, 11 pages.

* cited by examiner

VARIABLE TRANSMISSION AND METHOD AND SYSTEM OF MANUFACTURE

CROSS-REFERENCE TO RELATED APPLICATION

This application is the U.S. national phase of PCT Application No. PCT/US2013/039214 filed on May 2, 2013, which claims benefit of U.S. Provisional Application No. 61/641,939 filed on May 3, 2012, the disclosures of which are incorporated in their entirety by reference herein.

TECHNICAL FIELD

Various embodiments relate to a continuously variable transmission mechanism for transmitting torque across a wide torque range and speed ratio range, and to a method and a system for manufacturing the transmission mechanism.

BACKGROUND

Continuously variable torque range characteristics for a power transmission may be achieved using a friction belt and pulley arrangement. A drive pulley and a driven pulley, connected by an endless belt, are adapted to transfer torque across an infinitely variable torque range by adjusting the pitch diameter of the pulleys. The pitch diameter of the driving pulley increasing as the pitch diameter of the driven pulley decreases, and vice versa.

Continuously variable torque range characteristics may also be achieved using a hydraulic pump as a driving member and a hydraulic motor as a driven member. The pump and motor are located in a closed hydrostatic fluid pressure circuit. By varying the pump displacement, the effective speed ratio of the hydrostatic transmission can be changed through a wide torque range.

Various types of variable friction drives are also known. The relative positions of a driving cone member and a driven cone member may be adjusted to provide a variable torque range characteristic. Known friction cone drives typically have frictional contact between the surfaces of friction cones at a contact patch established between the cones; however, these systems may have a low level of torque capability. Friction torque at the contact patch is developed by a tangential force component on the surface of each cone member. Because of the geometry of the conical surfaces, the contact patch has incremental areas where a sliding motion occurs between the conical surfaces of the driving and driven members within the contact patch. This sliding motion requires the presence of a hydraulic lubricating oil film to avoid galling and deterioration of the friction surfaces of the conical members. The presence of an oil film, however, is imperfect protection against deterioration and wear of the friction surfaces.

SUMMARY

In an embodiment, a continuously variable transmission is provided for transmitting torque between a drive shaft rotating about a first longitudinal axis and a driven shaft rotating about a second longitudinal axis. A driving member rotates about the first longitudinal axis. A driven member rotates about the second longitudinal axis. An intermediate member is interposed between the driving member and the driven member. The intermediate member rotates about a third longitudinal axis having a variable angle with respect to the first and second axes. The third longitudinal axis is and configured to intersect the first and second longitudinal axes. Torque is transferred from the driving member to the driven member via the intermediate member.

In another embodiment, a method for forming a torque transfer member for a variable transmission is provided. A base structure is provided and has first and second ends axially opposed from one another, with a cross-sectional area of the first axial end being less than a cross-sectional area of the second end. A needle assembly having a ribbon supporting needles extending from pockets defined by the ribbon is wrapped around an outer surface of the base structure by abutting an edge of the ribbon to the outer surface of the base structure such that the series of needles extend outwardly from the base structure. The needle assembly is affixed to the base structure.

In yet another embodiment, a method of manufacturing a needle assembly for use with a variable transmission is provided. A first series of pockets is formed on a first side of a first ribbon. A first series of needles is organized such that each of the first series of needles is positioned into a respective pocket in the first series of pockets. The first series of needles is affixed into the first series of pockets.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A variable transmission mechanism and methods associated with the transmission are described in U.S. Pat. No. 6,338,692 B1 issued on Jan. 15, 2002; U.S. Pat. No. 6,964,630 B1 issued on Nov. 15, 2005; U.S. Pat. No. 7,399,254 B2 issued on Jul. 15, 2008; and U.S. Pat. No. 7,704,184 B2 issued on Apr. 27, 2012, the contents of which are incorporated by reference in their entirety herein.

Figure 1:
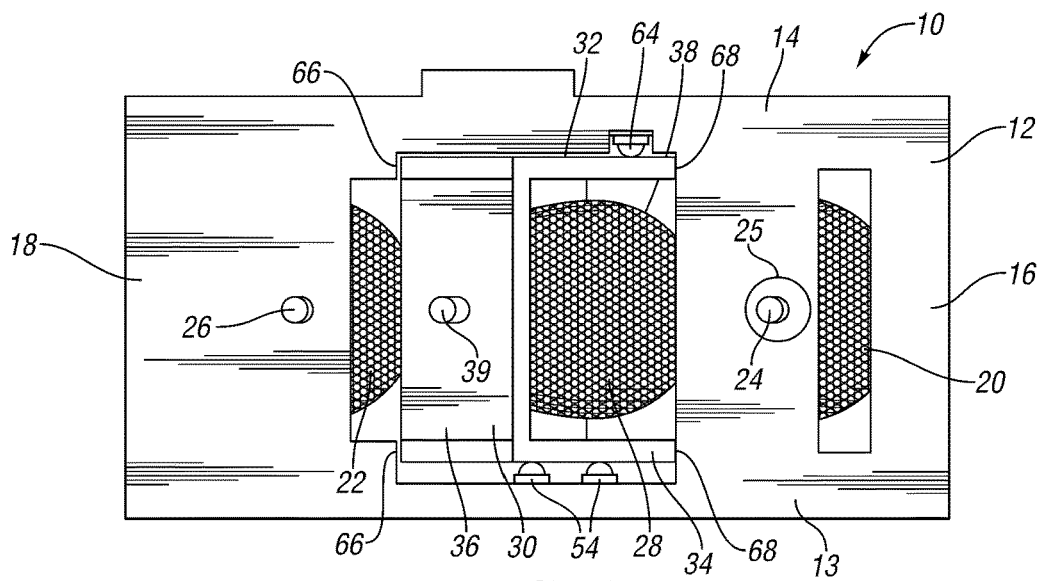
FIG. 1 is an end view of a transmission according to an embodiment.
Figure 2:
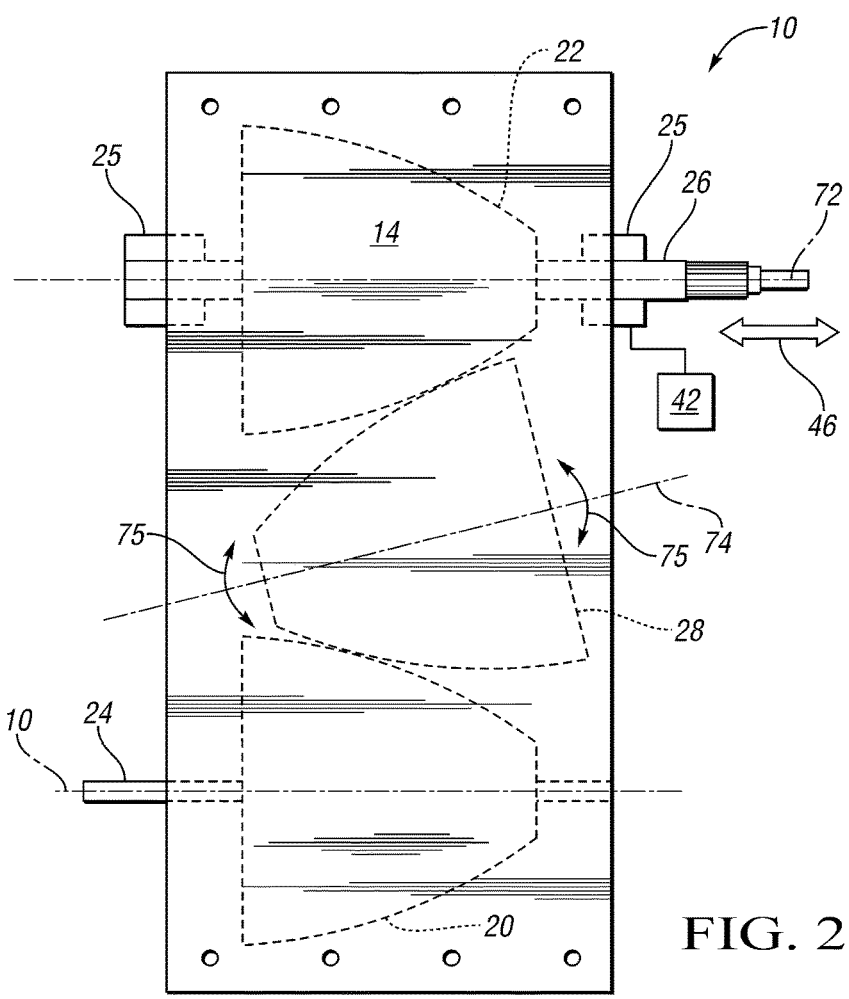
FIG. 2 is a top view of the transmission of FIG. 1 with internal members of the transmission shown in phantom.
Figure 3:
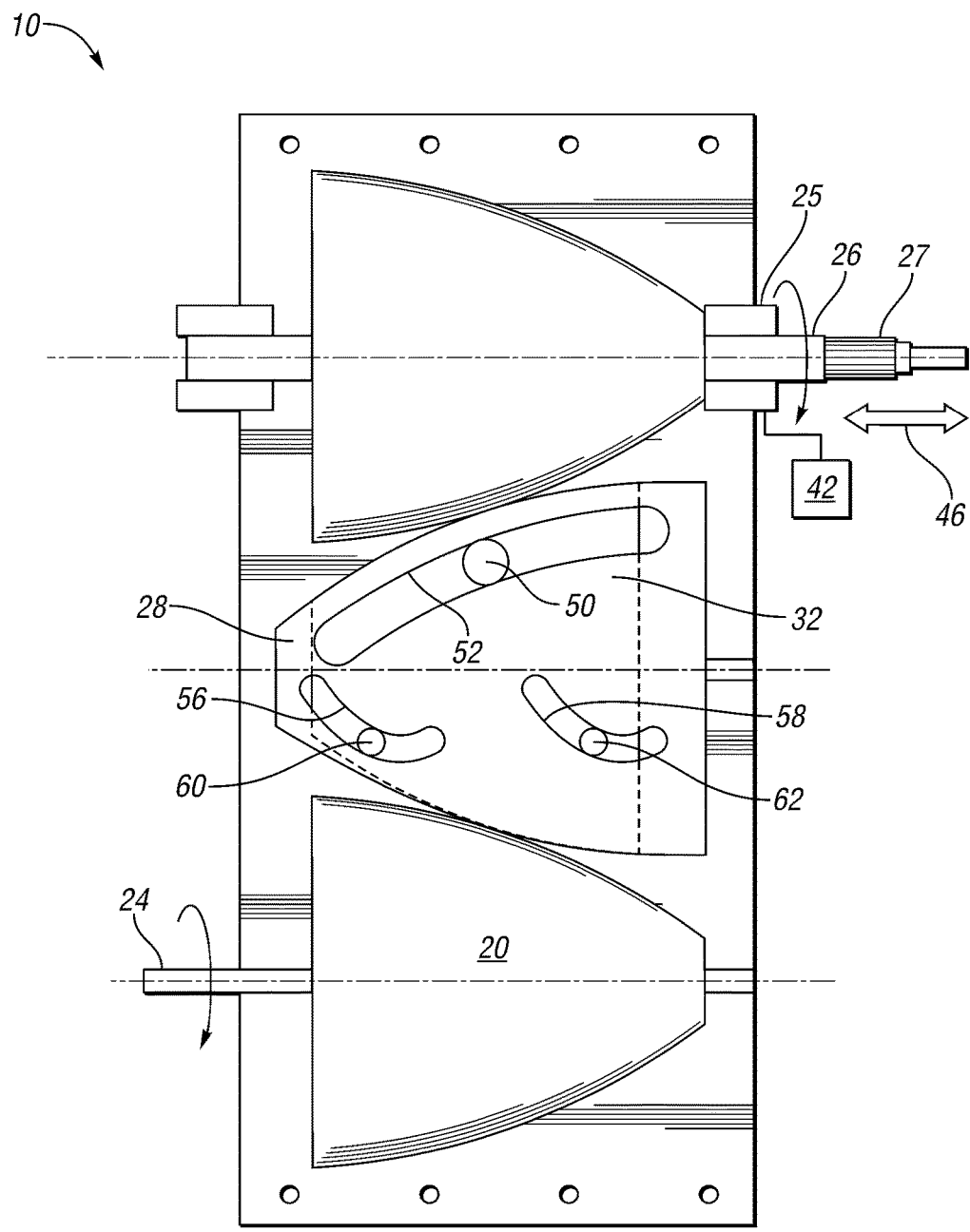
FIG. 3 is another top view of the transmission of FIG. 1 with a top plate of the transmission removed.

A transmission assembly according to an embodiment is generally designated by reference character 10 in FIGS. 1-3. The transmission 10 includes a main case or housing 12 having a base 13 and a top plate 14. A pair of side plates 16 and 18 supports the top plate 14 above the base plate 13. For purposes of this description, the housing 12 is shown as an open housing to allow for a partial view of the internal torque transfer members. In actual practice, the housing 12 may be closed to facilitate the use of a lubricant, such as powdered graphite, powdered polymer, liquid hydrocarbon lubricant, or other wet or dry lubricant as is known in the art. In a closed housing, the internal members may be protected from various harsh external environmental conditions.

A pair of internal torque transfer members is seen in the side view of FIG. 1 at 20 and 22. An intermediate torque transfer member is shown at 28. The members 20, 22, 28 are rotary and are generally conical or curved members. For purposes of this description, the internal torque transfer members 20, 22, 28 are referred to as conical or cone members; however, their geometry and surface shape is not limited to that of a cone or section of a cone, and may include other convex shapes, and curved geometries including varying rates of curvature.

A torque input shaft 24 coincides with the geometric axis of the cone member 20 and is connected to it. A torque output shaft, schematically shown in FIG. 1 at 26, is connected to cone member 22. Each cone member 20, 22 is journalled for rotation about its geometric or longitudinal axis, which is also the longitudinal axis of its respective shaft 24, 26. The cone member 20 is fixed, and may only rotate within the transmission 10. The cone member 22 may rotate and translate within the transmission 10 due to a journalled connection 25 permitting the cone member 22 to translate along the longitudinal axis of its shaft 26. The cone member 22 is connected to a drive shaft by means of a descending or plunging spline 27, which allows the cone member 22 to translate with respect to the drive shaft. In alternative embodiments, the cone member 20 may rotate and translate via a journalled connection and have a plunging spline connection to its drive shaft, while the cone member 22 may be fixed and only rotate. The torque input shaft 24 coincides with the longitudinal axis of the cone member 20 and is connected to it. The torque output shaft 26 coincides with the axis of the cone member 22 and is connected to it.

The third, intermediate cone member 28 is on a carrier 30. The carrier 30 has an upper plate 32 and a lower plate 34. Side members 36 and 38, together with the plates 32 and 34, define the carrier 30 housing for the cone member 28. Although only one intermediate cone member 28 is illustrated for use with the transmission 10, multiple intermediate cone members 28 may also be used, with single or multiple carrier configurations.

The cone member 28 is mounted for rotation about its geometric axis within the carrier 30. The cone member 28 is supported for rotation by shaft 39 which extends through journalled openings formed in the side members 36 and 38.

The shafts 24 and 26 may be connected, respectively, to a drive shaft and to a driven shaft, or alternatively, may be the drive shaft and driven shaft themselves. For example, for use of the transmission in a vehicle, the drive shaft is connected to a prime mover, such as an engine or an electric machine, and the driven shaft is connected to the wheels.

Torque is transferred from the input shaft 24 to the connected driving cone 20 and then to the intermediate cone 28 through a contact patch between the cones 20, 28. Torque is then transferred from the intermediate cone 28 to the driven cone 22 through another contact patch between the cones 28, 22, and to the connected output shaft 26. The position of cone 22 may be adjusted with respect to cone 20 thereby causing a change in the angular position of cone 28, as described below, to vary and control the speed ratio and the torque across the transmission unit 10. Generally, as cone 22 is moved along its longitudinal or rotational axis, the geometries of the cones 20, 22, 28 cause forces to be imparted on cone 28, thereby causing it to change its angular position. Cone 28 is supported such that it can move in response to the movement of cone 22.

An adjustable mechanism 42 may be operably connected to the journalled housing 25 to permit controlled translation of the cone 22 within the transmission 10 as shown by directional arrow 46. Although a mechanical slide 42 is shown, other types of actuators for adjusting the cone member 28 may be used. For example, servo actuators or a ball screw drive could be adapted to perform the function of mechanism 42. Other mechanisms may be also be used to provide the controlled positioning of cone 22 as described herein.

In an alternative embodiment, where the cone 20 is the one configured for translation, the mechanism 42 is attached to the journalled connection permitting translation of the cone 20. In other embodiments, the position of cone 22 is not controlled, and the longitudinal position of the cone 22 is permitted to float, thereby eliminating the mechanism 42. In this scenario, the cone 22, and intermediate cone 28, will position themselves into a speed ratio based on the combination of the input speed to cone 20 and the resistance load on shaft 26.

When the mechanism 42 causes the cone member 22 to translate, the changing position of the cone 22 interacts with the intermediate cone member 28 and causes it to change its angular position within the housing 12. The structure and support of the carrier 30 allows the intermediate member 28 to move in response to the movement of cone 22. The upper plate 32 of the carrier 30 has grooves 56, 58, which are engaged respectively by guide pins 60, 62 secured to the underside of the upper plate 14. The grooves 56 and 58, together with the pins 60 and 62, respectively, determine the angular position of the carrier 30 as the cone 28 moves.

The carrier 30 for the intermediate cone member 28 is supported on the lower plate 13 of the housing 12 by ball bearings 54. The bearings 54 may be spherical bearing elements seated in a semispherical pocket formed in the lower plate 13. The spherical bearing elements, when adapted for universal movement in the semispherical pockets, permit the lower plate 34 of the carrier 30 to float on the lower plate 13 of the housing 12.

As shown in FIG. 1, the underside of the top plate 14 is provided with ball bearings 64. Although only one ball bearing 64 is illustrated, multiple ball bearings 64 may be used with the transmission 10. These bearings 64 may be a spherical bearing element that is received in a semispherical pocket, similar to bearing 54. The bearings 54, 64 permit the carrier 30 to float within the confinement of the housing 12 defined by upper and lower plates 14, 13 and side stops 66, 68. Further, any bearing arrangement as is known in the art may be used to obtain the floating function of bearings 54 and 64 and the guiding function of bearing strips 44.

In FIGS. 1-3, the cone member 20 is a driving member and the cone member 22 is a driven member. The axis of rotation of the member 20 is shown at 70 in FIG. 2, and the corresponding axis of rotation of the cone member 22 is shown at 72. The overall speed ratio between the input shaft 24 and the output shaft 26 of the transmission 10 will vary as the cone 22 is moved, thereby changing the position of the cone 28 relative to the cones 20, 22 and the carrier 30 to move. By moving the cone 22 such that the intermediate cone 28 moves between its extreme positions as defined by the carrier 30 guide member 50 at either end of the guide slot 52, the location of the contact areas between cones 20, 28 and cones 28, 22 will change to provide the range of ratios.

The cone member 28 has a variable angular orientation with respect to cone members 20, 22. The driving cone member 20 is fixed in the housing 12 such that it may only rotate about its longitudinal rotational axis 70. The driven cone member 22 is positioned in the housing 12 such that it may rotate about its longitudinal rotational axis 72 as well as translate along the axis 72. The angular position, when looking from a top down perspective as shown in FIG. 2, of the cones 20, 22 does not change in the embodiment shown in FIGS. 1-3. In other words, the rotational axes 70, 72 of the cones 20, 22 are fixed.

By fixing cone 20 on its rotational axis 70 such that it may not translate, an input shaft to the transmission 10 may be directly connected or directly splined to the cones 20 without the need for additional mechanical connections such as spline connections providing extensions in length such as plunging splines, rotating connectors such as U-joints, and the like. By fixing cone 22 on its rotational axis 72 such that it may only rotate about and translate along the axis 72, but has a fixed angular position when taken from a top view as seen in FIG. 2, an output shaft to the transmission 10 may be connected using only a descending or plunging spline or other mechanical connection providing extensions in length, without the need for additional mechanical connections such as rotating connectors including U-joints, and the like. By eliminating these additional mechanical connectors, the design torque limit of the transmission 10 may be increased as the torque is not limited to what may be carried by any additional mechanical connectors. The elimination of these mechanical connectors also serves to simplify the system as well as reduce weight. Also, fixing the input and output rotational axes may permit improved packaging of the transmission in implementation.

The intermediate cone 28 rotates about its longitudinal rotational axis 74, and has varying angular positions with respect to the housing 12 through use of the guide pin 50 and slot 52. In other words, the position of the rotational axis 74 of the intermediate cone 28 may vary in the direction as shown by arrow 75 when looking from a top down perspective with respect to the transmission, as shown in FIG. 2. By varying the angular position of the intermediate cone member 28 the changing translational position of the cone 22 along its, transmission 10 can be configured for underdrive, overdrive, and intermediate speed ratios.

Figure 4:
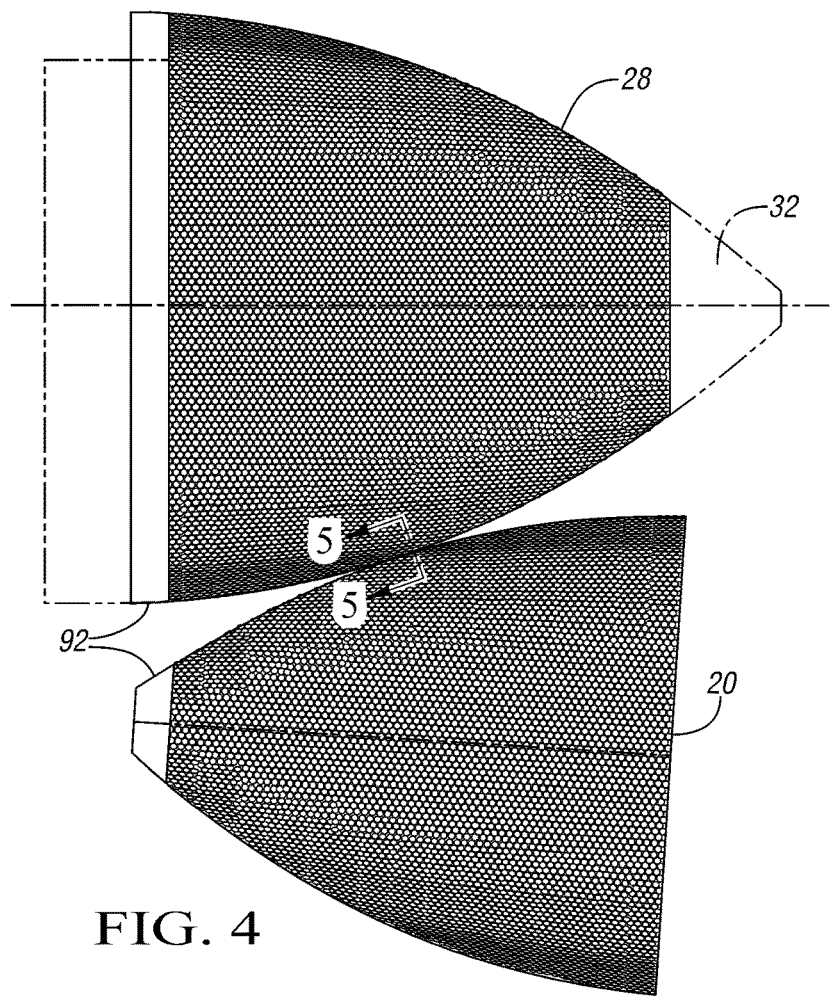
FIG. 4 is a top view of a pair of the conical members of the transmission illustrating an engagement interface where torque transfer occurs between the members.
Figure 5:
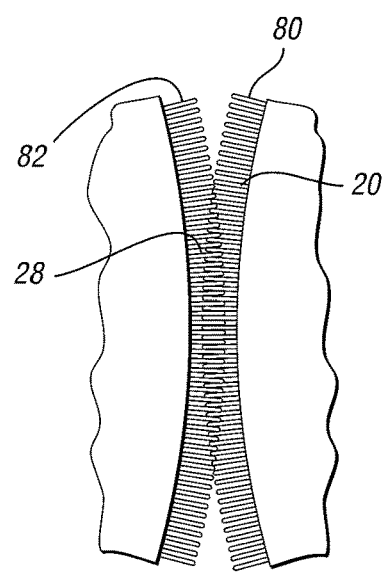
FIG. 5 is a cross sectional view of the engagement interface as seen from the section line in FIG. 4.

FIGS. 4 and 5 show the details of interaction between two of the cone members according to an embodiment. Interaction between any two cone members behaves generally in similar manner. The cone members are formed of a suitable rigid structural material. In the example shown, the cone member 20 is fixed for rotation, as explained previously, with the torque input shaft 24 and cone member 28 adjustable via the carrier 30 and plate 32. The curved surface of the cone member 20 has torque transmitting elements 80 and the curved surface of cone member 28 has corresponding elements 82. The elements 80, 82 may be needles (as referred to herein), wires, fibers, pins, brush elements, denticles, teeth, or the like. Cone 22 (not shown in FIG. 4) also has a curved surface with needles to interact with corresponding needles 82 on the intermediate cone 28.

The needles 80 and 82 may be secured in cantilever fashion to the surfaces of the cone members 20, 28 and generally extend outwardly or perpendicularly from the respective curved surfaces of the cone members. The needles 80 intermesh with the needles 82 so that as torque is applied to the cone member 20, the cone member 28 is driven synchronously. As the cone members rotate, the needles 80 and 82 move into and out of registry so that there is a continuous driving connection between the cone members as torque is transmitted across the interface (as shown in FIG. 5). The interface is established by the intermeshed needles. The needle interface area forms the contact patch between the cone members. There may be some flexure of the needles at the interface to accommodate varying angular velocities of incremental segments on one cone curved surface with respect to the corresponding incremental surface on a companion cone curved surface. In this embodiment, there is no physical contact between the underlying curved surfaces, as in the case of a conventional friction cone drive. The area of the interface may change depending on the position of each cone with respect to the other, and the position of the interface with respect to the longitudinal axis of the cone. The interface area may vary based on the diameter of the cone at the interface, and any varying rate of curvature.

The density of the needles on the cone members may be changed depending upon the design requirements of a particular application. Further, the size of the needles (i.e., the length and diameter) also may be changed, as required.

The cones 20, 22, 28 may be the same size, or may be unequal in size. The geometry of the surfaces of the cone members is a function of the overall ratio range that is required for a particular application for the transmission 10. The cones may have a generally hemispherical shape, a generally conical section shape, or have a curved surface according to another geometry.

Figure 6:
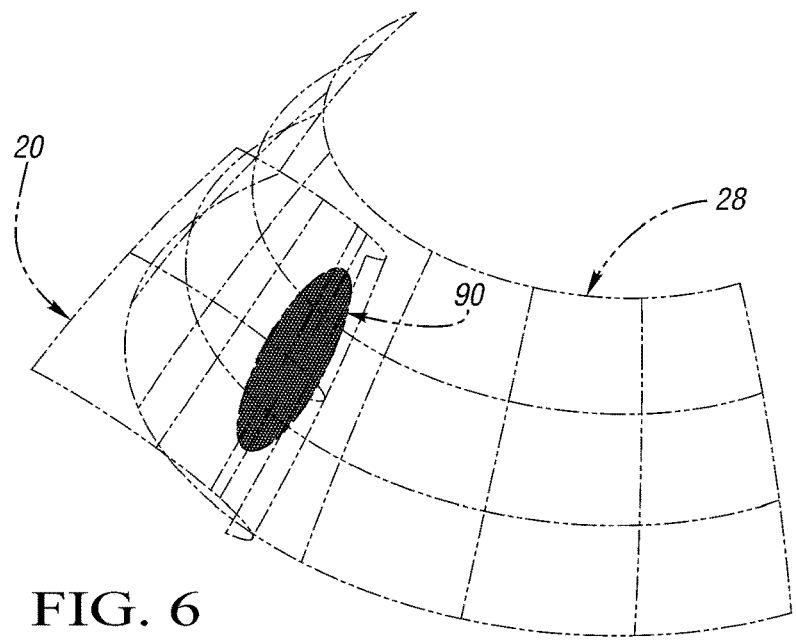
FIG. 6 is a perspective view of the surfaces the members shown in FIG. 4 and the engagement interface.

FIG. 6 is a perspective view of the curved surfaces of two adjacent cone members, for example a driving member 20 and an intermediate member 28, or alternatively, an intermediate member 28 and a driven member 22. The area of mesh, interface, or contact patch, for the needles on the members 20 and 28 is indicated at 90. The area of mesh 90 may be generally elliptical, or may be another shape based on the size and shape of the adjacent cone members. The location of the area of mesh 90 on the members 20 and 28 shifts between the ends of the members 20, 28 based on whether the torque transferred between the members is increasing or decreasing.

End regions 92 of the cone members may be designed such that they are not covered by needles (i.e., they are bald). When the cone members are adjusted to the maximum underdrive positions with the end areas 92 in substantial registry, the transmission 10 will be in a neutral mode with no torque transfer between the cone members. The carrier 30 can be designed to provide a slight clearance between the end surfaces 92 when they are in registry. This neutral mode feature makes it possible to provide interruption in torque transfer through the torque flow path without the need for a separate neutral clutch.

The density of the needles for each cone member may be non-uniform if that is required for a particular design application. Further, the density of the needles of one cone may differ from the density of the needles of an adjacent cone member.

The needles may be formed of high carbon alloy steel. Other materials that may be used for this purpose are structural polymers, spring steel, or the like. For low torque applications, non-metallic needles such as molded nylon needles or various nonferrous, polymer-based materials could be used. In some embodiments, the needle density may be about ten thousand needles per square inch on each cone. In other embodiments, other needle densities may be used.

In one embodiment, for a high load application such as automotive or truck transmissions, the needle density may be 10,000 wires per square inch, using 0.006 inch stainless steel wire, positioned on 0.009 inch centers. Each contact patch area for a high load application may be approximately two square inches, and may be primarily oblong in shape. The depth of penetration of needle-to-needle varies within the contact area, based on the relative diameters of the cone members.

The area of the contact patch may be larger or smaller than two square inches based on the size and diameter of the cone member and depending on the application.

Powdered graphite may be used as a lubricant for the cone members to reduce friction, although lubricating oil or a lubrication oil mist may be used, particularly if cooling is needed. Polymer powder or a liquid polymer lube also may be used. However, an oil film at the needle interface for the cone members is not required for torque transfer as in the case of friction cone drives. The torque transfer is accommodated by the needles as they flex without over-stressing of the needles. The needles themselves act as cantilever beams that are subject to a degree of flexure well below the elastic limit.

Although the needles for the disclosed embodiment of the invention extend radially from the axes of rotation of the cone members, they may be offset or biased in a non-perpendicular fashion if that configuration is desirable for a particular design or implementation.

Figure 7:
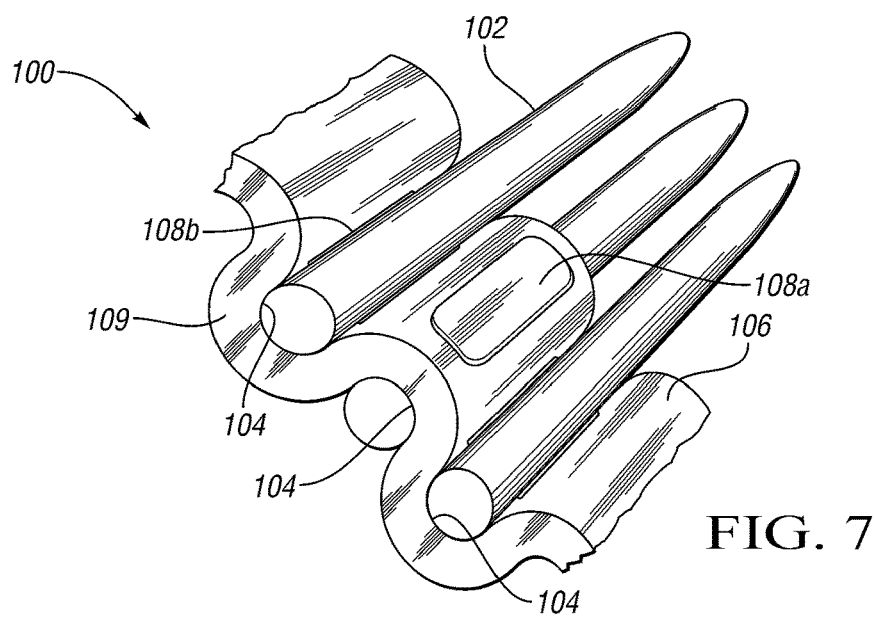
FIG. 7 is a partial view of a needle and ribbon assembly according to an embodiment.
Figure 8:
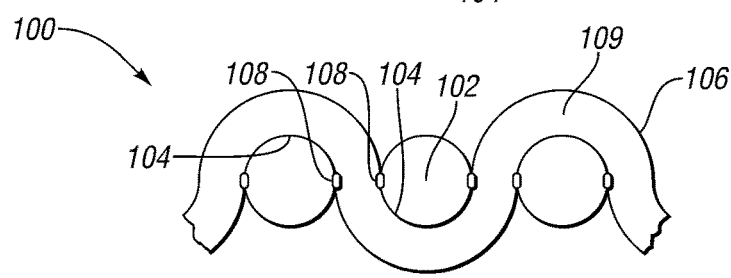
FIG. 8 is an end view of the partial view of FIG. 7.

An embodiment of a section of a needle assembly 100 is shown in FIGS. 7-8. Needles 102 are positioned within pockets 104 or crimps formed in ribbon stock 106. The needles 102 are connected to the ribbon 106, for example, using welding, microwelding, or another attachment method such as adhesive. In an example, resistance welding is used to attach the needles 102 into the pockets 104 of the ribbon 106. The resistance welding process provides a weld 108a through the ribbon 106 and to the needle 102, and may extend across approximately the width of the ribbon 106. In another example, a laser tack weld 108b can be used to attach the needles 102 to the pockets 104. The welds 108a or 108b may extend the width of the ribbon, or may only extend along a portion of the width of the ribbon. The pockets 104 may be preformed into the ribbon 106 using a crimping tool which forms the pockets 104 before the needles 102 are inserted. Although a tack weld 108b is shown on both sides of the needles 102, a single weld may be used on one side of the needle. The needle assembly 100 is wound about a cone member. One edge 109 of the ribbon 106 is connected to the outer surface of a cone member such that the needles 102 extend outwardly from the cone member.

Figure 9:
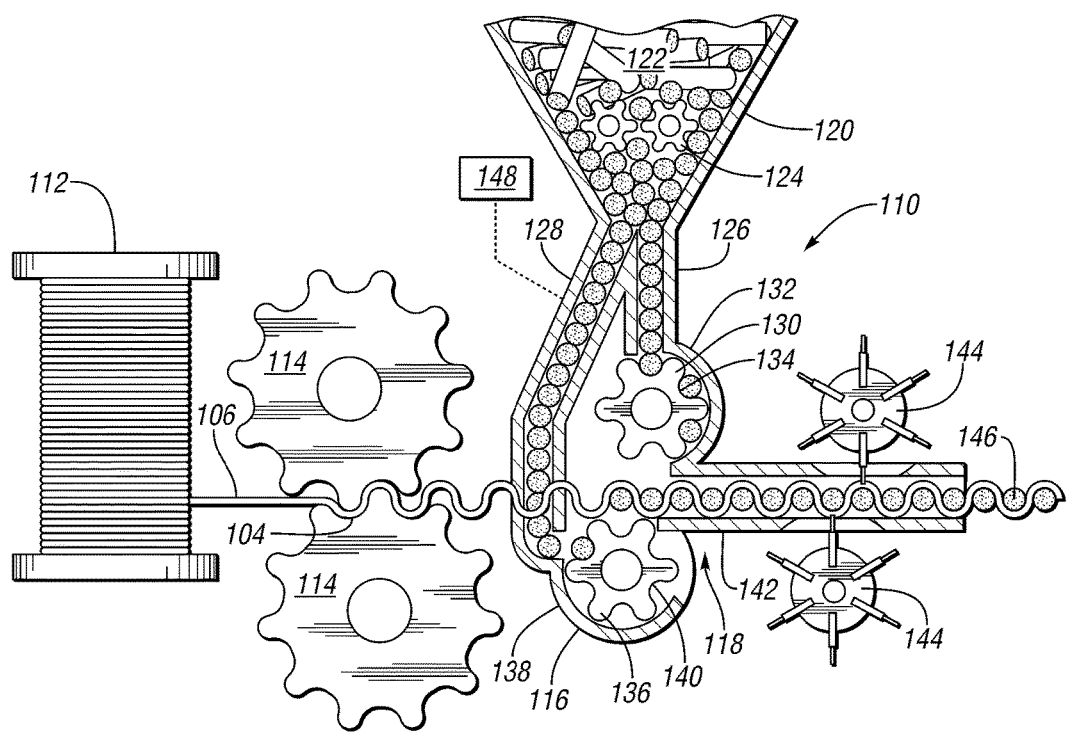
FIG. 9 is a schematic illustrating a system and method for providing a needle and ribbon assembly.
Figure 10:
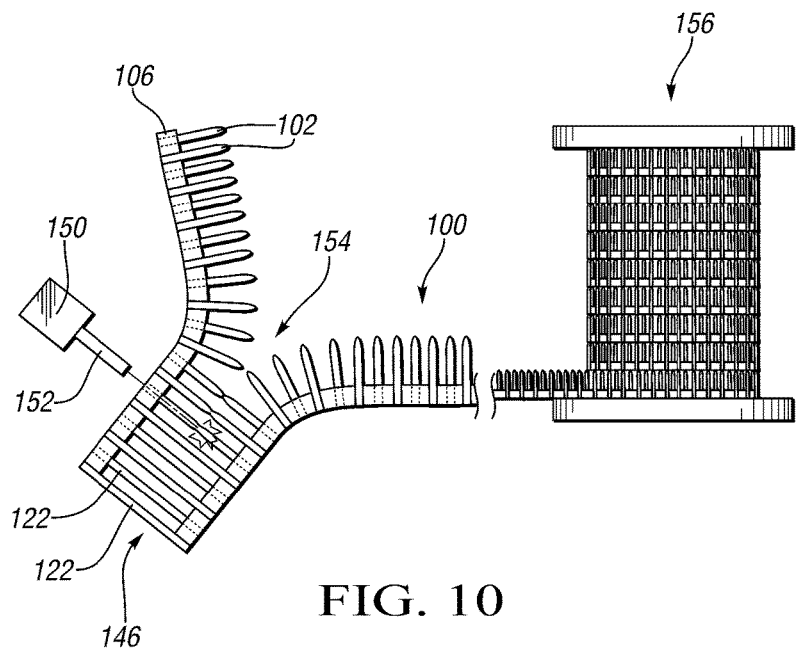
FIG. 10 is another schematic illustrating a system and method for providing a needle and ribbon assembly.
Figure 11:
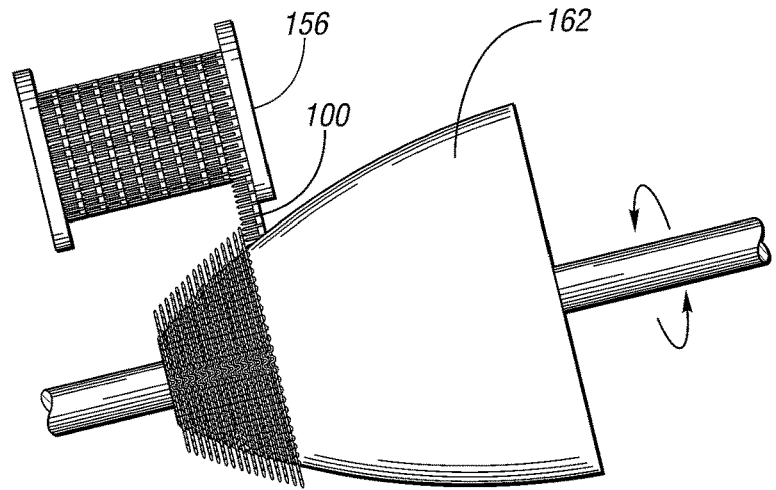
FIG. 11 is a schematic illustrating a system and method for providing a needle and ribbon assembly on a member of a transmission.
Figure 13:
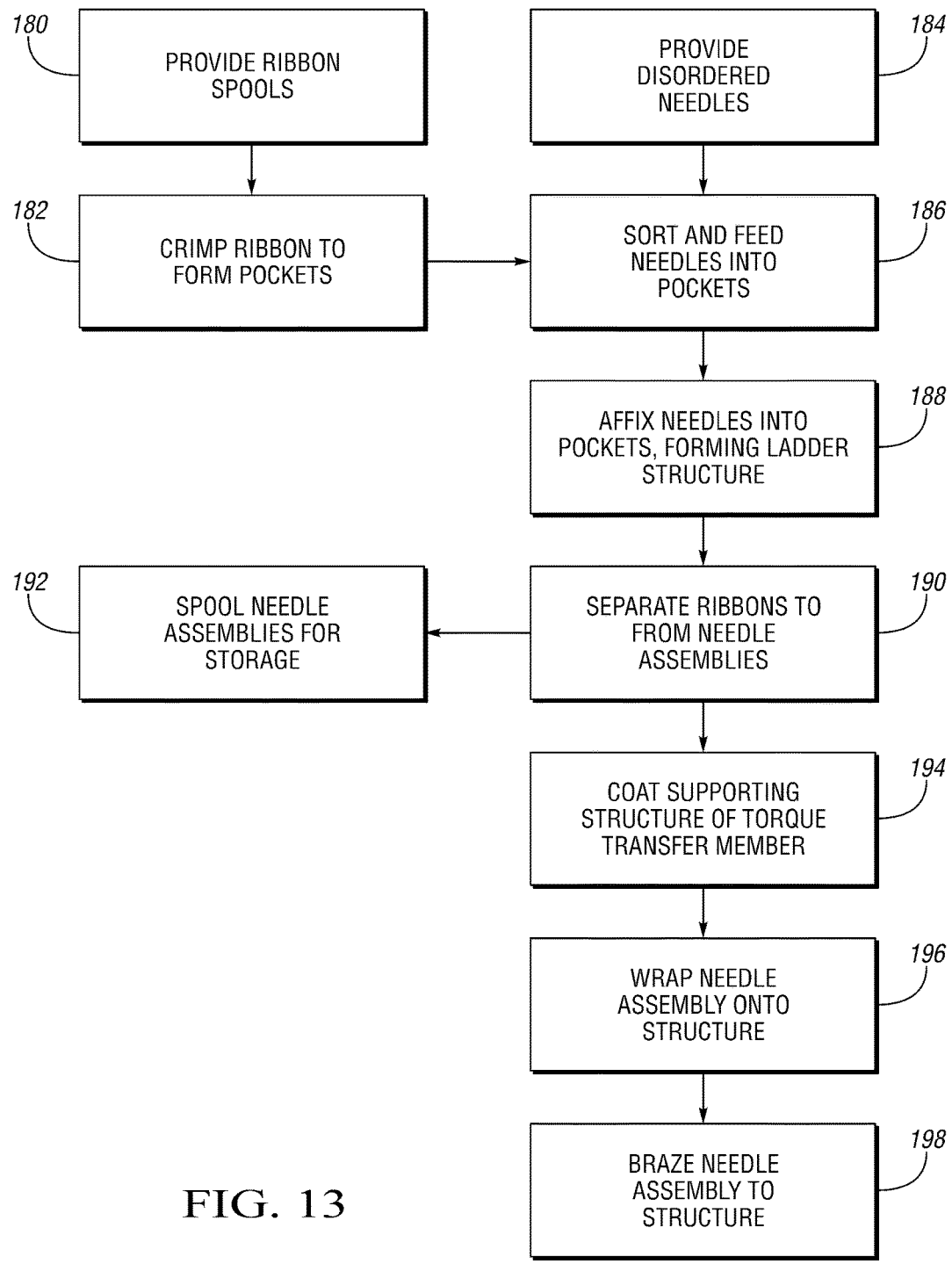
FIG. 13 is a flow chart illustrating a method for providing a needle and ribbon assembly and connecting the assembly to a member of a transmission.

The needle assembly 100 may be manufactured and installed onto a cone member using a method and system as described with respect to FIGS. 9-11 and correspond to the flow chart and steps shown in FIG. 13. Ribbon stock is provided at step 180. Ribbon stock 106 is fed into a needle assembly apparatus 110 from spools 112 of ribbon stock 106. In the embodiment shown, a pair of ribbon stock 106 is fed into the apparatus 110. The ribbon stock is spaced apart with only the front ribbon shown in FIG. 9. Of course, other numbers of ribbon stock 106 may be fed into and used with various embodiments of the assembly apparatus 110 including a single feed of ribbon stock 106, or two, four, or more feeds of ribbon stock 106.

The ribbon stock 106 may be a wire with a rectangular cross section as shown in FIG. 7. The two feeds of ribbon stock are spaced apart by a predetermined amount using a guide system (not shown). Each ribbon stock 106 has pockets 104 or crimps formed using a pair of crimping sprocket wheels 114 at step 182. Other numbers of wheels 114 or alternative methods of providing a crimp to the ribbon 106 may also be used with the apparatus 110. The crimped ribbons 116 proceed to a needle loading station 118.

The needle loading station 118 has a hopper 120 containing wires 122 precut to a predetermined length. The needle hopper 120 may be manually refilled or may have an automated wire cutter upstream to provide the stock 122 as disordered needles at 184. A sorting mechanism 124 organizes the disordered wires 122 such that they can be fed into channels 126, 128. The sorting mechanism 124 acts to organize the wires 122 such that there is a feed of wires 122 in single file within the channels 126, 128 by the exit area of the channels at step 186. In another embodiment, the wire cutting and sorting operations place the wires 122 into cartridges with the wires 122 in an organized fashion, such as in rows. The cartridges may then be inserted into and directly used with the apparatus 110 such that the wires 122 are fed from the cartridges to the pockets of the ribbon.

The ribbons 116 are spaced apart by approximately the length of a wire 122. The first channel 126 feeds wires 122 to a first side of the pair of ribbons 116. A pin loading wheel 130 and guide 132 positions a wire 122 within corresponding pockets 104 on the first side of the ribbons 104. The end regions of the wire 122 are aligned with the two ribbon stocks 106 (see FIG. 10) such that a ladder structure is formed. The wheel 130 is shaped such that a single wire 122 is transferred by a recess 134 on the wheel 130.

The second channel 128 feeds wires 122 to the second, opposing side of the ribbons 116. A pin loading wheel 136 and guide 138 positions one wire 122 within corresponding pockets 104 on the second side of the ribbons 104. The end regions of the wire 122 are aligned with the two ribbon stocks 106 (see FIG. 10) such that a ladder structure is formed. The wheel 136 is shaped such that a single wire 122 is transferred by a recess 140 on the wheel 136.

After the wires 122 are positioned into pockets 104 on the ribbons 106 at step 186, the assembled, but unconnected parts, are fed into a channel 142 which is sized such that the wires 122 remain located within their respective pockets 104. In an embodiment, a pair of welders 144 are positioned with one spot welder on either side of the channel 142 to weld the wires 122 within their pockets 104 in the ribbons 106 at step 188. Additional welders 144 may also be used with the apparatus 110 with one welder 144 for each side of each of the pair of ribbons 106, and/or for organized or sequential welding processes. The welders 144 may provide a spot weld and may be selected based on speed, penetration, precision, and/or material properties of the wire 122 and ribbon 106. The welders 142, 144 may provide resistance microwelding. In other embodiments, the welders 142, 144 may be fixed spot welders, rotary spot welders, or other welding devices, and may provide a laser spot weld, a resistance weld, or the like.

The apparatus 110 may be controlled using a controller 148. The controller 148 acts to coordinate and control the various processes to result in the assembly product 146. The controller may use sensors or other systems to provide automated inspection, process control, and quality control and may include automated optical inspection, machine vision technology, and the like.

The wire and ribbon assembly 146 leaves the assembly apparatus 110 and proceeds to a separating process at step 190 and shown in FIG. 10. The assembly 146 is treated by a laser or heat process from apparatus 150, which may be a laser, a radiant heat source directed by reflectors, or the like. The energy beam 152 from the apparatus 150 is directed to a central region 154 of the wires 122 in the assembly 146. The wires 122 are softened by energy from beam 152 in a localized region 154.

The ribbons 106 are then pulled apart while region 154 is in a weakened state using feed guides or another mechanism providing opposed forces to form the individual needle and ribbon assemblies 100 at step 190. The softened wires 122 separate at the localized region 154 during this process to form the needles 102. Based on the amount of energy provided and the material properties of the wires 122, the needles may be formed with rounded or other tip shapes during the separation process, with the tip shape setting as the needles cool.

In an alternative embodiment, the wire and ribbon assembly 146 may be separated at step 190 by mechanically cutting the wires 122 in a central region of the wires 122 to form the needles 102.

The ends of the needles may be bullet-shaped or rounded as seen in FIG. 7 to facilitate movement of the needles of one cone member into registry with the needles of the other cone member as the cone members rotate. Other designs for the ends of the needles also are possible. For example, the needles may have a sharp tip or a blunt tip. The cross sectional area of the needles may be variable from the base to the tip.

The needle and wire assemblies 100 may be fed and wound onto a spool 156 for later use at step 192, or alternatively, the assembly 100 may be directed to a cone winding process 160 as illustrated in FIG. 11.

A cone support member 162 is supported by a winding mechanism. The cone support member 162 provides the underlying structure for a cone used in the transmission 10. For example, the cone support member 162 is a hollow structure, and is made from a metal. In other examples, the cone support member 162 may be solid or contain additional interior support structure, and may be made from other appropriate materials. The support member 162 provides underlying structure and support for the cone and may be manufactured using a casting process, molding process, or other manufacturing technique as is appropriate for the material used. The needle and wire assembly 100 is fed onto the support member 162 and wound around the outer surface in an organized fashion progressing along the axial length of the support member 162.

The edge 109 is positioned adjacent to the outer surface of the cone 162 so that the needles 102 extend away from the cone member 162. For example, the needles 102 may extend generally perpendicularly from the cone surface.

The cone member 162 may be coated with a solder powder material prior to winding the assembly 100 onto its surface at step 194. Once the assembly 100 has been wound onto the solder covered cone 162 surface at step 196, a heating process at step 198 can be initiated to form a bond between the ribbon 106 and the cone 162, and between adjacent ribbons 106. The heating process may be a brazing technique as is known in the art. The final cone 20, 22, 28 becomes a fused single unit due to the bonds between the ribbons 106 and the underlying cone structure 162.

Alternatively, the assembly 100 may be connected to the cone member 162 using an adhesive material or epoxy. This may be used for example when the needles or needle assembly is made from a polymer material, or when the adhesive strength is not exceeded by loads to be transmitted by the transmission 10.

The cones 20, 22, 28 may have a hollow interior or interior portions, thereby reducing weight of the transmission 10.

Figure 12:
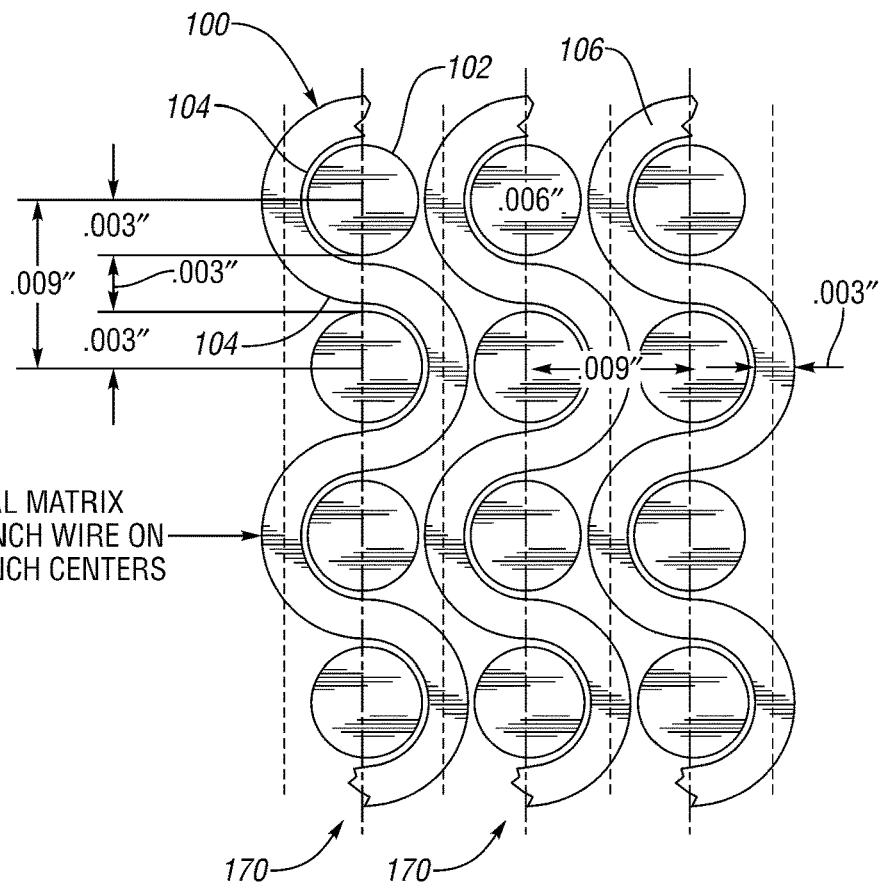
FIG. 12 is a top view of a needle and ribbon assembly after installation on a member of a transmission.

The needles are arranged in a dense pattern over the surfaces of each cone member. A section of the needles as arranged on a cone member is illustrated in FIG. 12 by the process discussed with respect to FIG. 11. The needle and ribbon assembly 100 is arranged in generally parallel rows 170 such that each row 170 is aligned with its adjacent rows 170. Based on the geometry on the underlying cone structure 162, the needles 102 in one row 170 may be offset from needles 102 in an adjacent row 170 in varying degrees. By organizing the needles 102 on the cone structure 162, the needles on one cone will interface cleanly with needles on an adjacent cone when used in a transmission 10.

In one example, the spacing between adjacent needles may be about 0.009 inches in the direction of the longitudinal axis of each cone members. The spacing between adjacent needles measured in a direction transverse to the axis of each cone members also is approximately 0.009 inches to form the centers of pockets 104. The needles themselves are generally cylindrical, as indicated in the view of FIG. 7. The diameter of the needles may be approximately 0.006 inches so that only a slight clearance is provided between the needles of one cone member relative to the needles of the other cone member. A typical length for the needles above the ribbon may be 0.100 inches. In other embodiments, the needle length may be 0.050-0.150 inches above the ribbon. Of course, other dimensions for the needles and the needle spacing may also be used with a cone for the transmission 10.

A flow chart illustrating an embodiment of a process for forming needle assemblies and attaching the needle assemblies to a torque transfer member structure is illustrated in FIG. 13. The process includes steps as described previously with respect to FIGS. 9-11.

Figure 14:
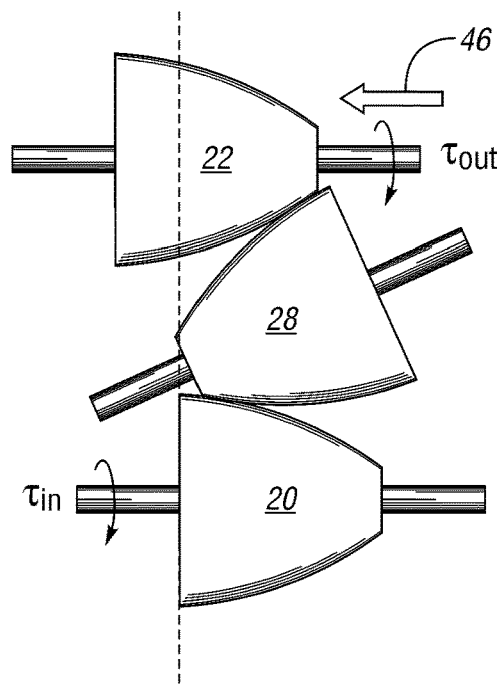
FIG. 14 is a schematic of the transmission of FIG. 1 in an overdrive configuration.

A schematic of the torque transfer members of the transmission in an overdrive configuration is illustrated in FIG. 14. In an overdrive configuration, the speed of the output shaft of the transmission is higher than speed of the input shaft to the transmission. For example, if each of the cone members has a 4:1 ratio available, the interface location between cone 20 and cone 28 would cause cone 28 to rotate four times faster than cone 20, and the interface location between cone 28 and cone 22 would cause cone 22 to rotate four times faster than cone 28. This leads to a 16:1 speed ratio (output to input) across the transmission.

A schematic of the torque transfer members of the transmission in an underdrive configuration is illustrated in FIG.

15. In an underdrive configuration, the speed of the output shaft of the transmission is lower than speed of the input shaft to the transmission. For example, if each of the cone members has a 4:1 ratio available, the interface location between cone 20 and cone 28 would cause cone 28 to rotate four times slower than cone 20, and the interface location between cone 28 and cone 22 would cause cone 22 to rotate four times slower than cone 28. This leads to a 1:16 speed ratio (output to input) across the transmission.

Figure 15:
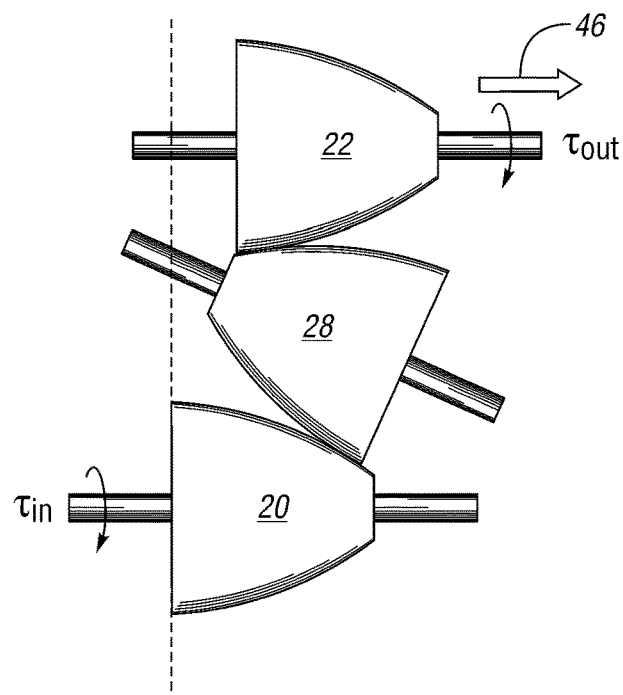
FIG. 15 is a schematic of the transmission of FIG. 1 in an underdrive configuration.

The two configurations of the transmission as illustrated in FIGS. 14 and 15 are for example only. Other configurations provide other ratios across the transmission, and the ratio is continuously variable between the minimum underdrive configuration and maximum overdrive configuration, and may include a direct drive ratio where the input and output speeds are equal. Additionally with changes in the radius of curvature and the various sizing of the cones, the available ratio range for the transmission 10 can be controlled and changed.

As such, various embodiments according to the present disclosure provide for a transmission with a continuously variable ratio where the input shaft and corresponding driving member rotate about a common fixed axis, and the output shaft and corresponding driven member rotate about another common fixed axis, thereby eliminating rotational connectors between the shafts and the cones. One of the input and output cones 20, 22 may translate along its axis, thereby eliminating plunging splines, or other rotational connectors between the shafts and the connected members. An intermediate torque transfer member is interposed between the driving and driven members and the position of the rotational axis of the intermediate member may be changed in order to change the ratio across the transmission. A method of making the torque transmitting members is also disclosed and includes a method for providing needle assemblies, and a method for brazing the needle assemblies to a support structure for a torque transfer member.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A continuously variable transmission for transmitting torque between a drive shaft rotating about a first longitudinal axis and a driven shaft rotating about a second longitudinal axis, the transmission comprising:
   a driving member rotating about the first longitudinal axis;
   a driven member rotating about the second longitudinal axis; and
   an intermediate member interposed between the driving member and the driven member, the intermediate member rotating about a third longitudinal axis having a variable angle with respect to the first and second axes and configured to intersect the first and second longitudinal axes;
   wherein torque is transferred from the driving member to the driven member via the intermediate member;
   wherein one of the driving and driven members is configured to translate along its respective longitudinal axis and thereby change an angular position of the intermediate member to vary a speed ratio between the drive shaft and driven shaft;
   wherein the other of the driving and driven member is longitudinally fixed along its respective longitudinal axis; and
   wherein the first longitudinal axis is parallel to the second longitudinal axis, the first and second longitudinal axes are fixed, and the first longitudinal axis is offset from the second longitudinal axis.

2. The transmission of claim 1 wherein each member has a first end and a second end axially opposed to the first end, a cross-sectional area of the first end less than a cross-sectional area of the second end.

3. The transmission of claim 1 wherein the driving member and the intermediate member interact to form a first contact patch; and
   wherein the intermediate member and the driven member interact to form a second contact patch.

4. The transmission of claim 1 further comprising:
   a case configured to support the driving member for rotation and support the driven member for rotation; and
   a carrier supported by the case for rotational movement with respect to the case, the carrier configured to support the intermediate member for rotation about the third longitudinal axis.

5. The transmission of claim 4 further comprising a mechanism supported by the case and operably connected to the one of the driving and driven members, the mechanism configured to axially move the one of the driving and driven members and thereby move the carrier to change a position of the third longitudinal axis relative to the first and second longitudinal axes, and change an angular position of the intermediate member with respect to the driving and driven members.

6. The transmission of claim 5 wherein the carrier is configured to float in the case such that a force imparted from the one of the driving and driven members onto the intermediate member causes the carrier to move and change the angular position of the intermediate member.

7. The transmission of claim 6 wherein the carrier is operably coupled to the mechanism only via contact between the intermediate member and the one of the driving and driven members.

8. The transmission of claim 1 wherein each member comprises torque transfer elements circumferentially covering an outer surface region of each member.

9. The transmission of claim 8 wherein torque transfer elements of one of the members intermesh with torque transfer elements on an adjacent member for torque transfer between adjacent members.

10. The transmission of claim 1 where each member further comprises a needle assembly having a ribbon defining pockets containing needles, the needle assembly being circumferentially wrapped about an outer surface of the member.

11. The transmission of claim 1 wherein each member has a first end and a second end axially opposed to the first end, a cross-sectional area of the first end less than a cross-sectional area of the second end; and
   wherein each of the driving and driven members are oriented such that the first ends of each of the driving and driven members faces a first direction.

12. The transmission of claim 1 wherein each of the driving member, the intermediate member, and driven member are provided by a cone member.

13. A continuously variable transmission for transmitting torque between a drive shaft rotating about a first longitudinal axis and a driven shaft rotating about a second longitudinal axis, the transmission comprising:
- a driving member rotating about the first longitudinal axis;
- a driven member rotating about the second longitudinal axis; and
- an intermediate member interposed between the driving member and the driven member, the intermediate member rotating about a third longitudinal axis having a variable angle with respect to the first and second axes and configured to intersect the first and second longitudinal axes;
- wherein torque is transferred from the driving member to the driven member via the intermediate member;
- wherein the first longitudinal axis is parallel to and offset from the second longitudinal axis, and the first and second longitudinal axes are fixed; and
- wherein one of the driving and driven members are configured to move in translation along its respective longitudinal axis and thereby change an angular position of the intermediate member to vary a speed ratio between the drive shaft and driven shaft.

14. A continuously variable transmission for transmitting torque between a drive shaft rotating about a first longitudinal axis and a driven shaft rotating about a second longitudinal axis, the transmission comprising:
- a driving member rotating about the first longitudinal axis;
- a driven member rotating about the second longitudinal axis; and
- an intermediate member interposed between the driving member and the driven member, the intermediate member rotating about a third longitudinal axis having a variable angle with respect to the first and second axes and configured to intersect the first and second longitudinal axes;
- wherein each of the driving member, the intermediate member, and driven member are provided by a cone member;
- wherein torque is transferred from the driving member to the driven member via the intermediate member;
- wherein one of the driving and driven members is configured to translate along its respective longitudinal axis and thereby change an angular position of the intermediate member to vary a speed ratio between the drive shaft and driven shaft; and
- wherein the other of the driving and driven member is longitudinally fixed along its respective longitudinal axis.

15. The transmission of claim 14 wherein each member comprises torque transfer elements circumferentially covering an outer surface region of each member.

16. The transmission of claim 15 wherein torque transfer elements of one of the members intermesh with torque transfer elements on an adjacent member for torque transfer between adjacent members.

17. The transmission of claim 14 where each member further comprises a needle assembly having a ribbon defining pockets containing needles, the needle assembly being circumferentially wrapped about an outer surface of the member.

* * * * *